US011416458B2

(12) United States Patent
Vemulapalli et al.

(10) Patent No.: US 11,416,458 B2
(45) Date of Patent: Aug. 16, 2022

(54) EFFICIENT INDEXING FOR QUERYING ARRAYS IN DATABASES

(71) Applicant: Couchbase, Inc., Santa Clara, CA (US)

(72) Inventors: Sitaram Vemulapalli, San Jose, CA (US); Raghupathi Keshava Murthy, Union City, CA (US); Stephen Ching-Sing Yen, Atherton, CA (US); Abhinav Dangeti, San Francisco, CA (US)

(73) Assignee: Couchbase, Inc., Santa Clara, CA (US)

( * ) Notice: Subject to any disclaimer, the term of this patent is extended or adjusted under 35 U.S.C. 154(b) by 0 days.

(21) Appl. No.: 15/930,351

(22) Filed: May 12, 2020

(65) Prior Publication Data

US 2021/0357373 A1    Nov. 18, 2021

(51) Int. Cl.
*G06F 16/00* (2019.01)
*G06F 16/215* (2019.01)
*G06F 16/2453* (2019.01)
*G06F 16/22* (2019.01)

(52) U.S. Cl.
CPC ........ *G06F 16/215* (2019.01); *G06F 16/2264* (2019.01); *G06F 16/2453* (2019.01)

(58) Field of Classification Search
None
See application file for complete search history.

(56) References Cited

U.S. PATENT DOCUMENTS

| | | | |
|---|---|---|---|
| 8,266,150 B1* | 9/2012 | Lin | G06F 16/316 707/741 |
| 2012/0323929 A1 | 12/2012 | Kimura et al. | |
| 2017/0316041 A1* | 11/2017 | Delaney | G06F 16/2246 |
| 2019/0114329 A1* | 4/2019 | Livingston | G06F 16/148 |
| 2019/0179933 A1 | 6/2019 | Wang et al. | |
| 2020/0034296 A1* | 1/2020 | Wills | G06F 16/2365 |

OTHER PUBLICATIONS

Anonymous, "Compressing your Indexes: Index Key Compression (PART 1)," Mar. 14, 2016, five pages, [Online] [Retrieved on Oct. 5, 2021] Retrieved from the Internet <URL: https://blogs.oracle.com/dbstorage/post/compressing-your-indexes-index-key-compression-part-1>.
Anonymous, "Compressing your Indexes: Advanced Index Compression (PART 2)," Mar. 25, 2016, five pages, [Online] [Retrieved on Oct. 5, 2021] Retrieved from the Internet <URL: https://blogs.oracle.com/dbstorage/post/compressing-your-indexes-advanced-index-compression-part-2>.

(Continued)

*Primary Examiner* — Bai D Vu
(74) *Attorney, Agent, or Firm* — Fenwick & West LLP

(57) ABSTRACT

A database system performs queries on fields storing arrays of a database (i.e., array fields) using de-duplication indexes. The system generates de-duplication indexes for array fields. The de-duplication indexes include unique entries for corresponding distinct values stored by the array fields. The system uses the de-duplication indexes to perform efficient queries specifying corresponding array fields. The system may further generate de-duplication indexes corresponding one or more fields storing various types of values. In various embodiments, the system selects an optimal index from various indexes usable to execute a query, such as a de-duplication index and a conventional index.

20 Claims, 11 Drawing Sheets

(56) References Cited

OTHER PUBLICATIONS

Oracle, "Oracle® Database Data Warehousing Guide 10g Release 2 (10.2) B14223-02," Dec. 2005, pp. 1-620.
Oracle, "Oracle® Database Performance Tuning Guide 10g Release 2 (10.2) B14211-03," Mar. 2008, pp. 1-474.
Oracle White Paper, "Database Performance with Oracle Database 10g Release 2," May 2005, pp. 1-29.
PCT International Search Report and Written Opinion, PCT Application No. PCT/IB2021/053866, dated Jul. 28, 2021, 13 pages.

* cited by examiner

Document-Oriented Database System 100

EFFICIENT INDEXING FOR QUERYING ARRAYS IN DATABASES

BACKGROUND

Field of Art

This disclosure relates in general to database indexing, and in particular to indexing of array fields in databases and performing queries on array fields using de-duplication indexes.

Description of the Related Art

Enterprises store data in various types of data stores such as relational databases, object-oriented databases, graph databases, document-oriented databases and so on. A large amount of data is stored in relational databases that have a well-defined schema. Relational databases enforce data normalization through their schema, such that data redundancy and inconsistency is eliminated by dividing data into multiple tables (e.g., parent and child tables).

However, there is an increase in databases storing unstructured or semi-structured data. Examples of such data stores include document-oriented databases that store data represented using extensible markup language (XML) or JavaScript Object Notation (JSON). Such databases prefer data denormalization, such that data redundancy and inconsistency is increased by combining data previously separated into a single table or document, but as a result query performance is generally improved. However, in contrast with relational databases, these denormalized databases store data in arrays which may include any number of values represented by any combination of possible data types. The array structure in a document-oriented database can store arbitrary number of elements, for example, some instances may store few tens of elements and other instances may store several hundred thousand or even millions of elements. As a result, queries on array values present efficiency challenges.

Conventional systems create indexes on fields storing arrays. However, conventional systems place restrictions on how indexes can be created and used for querying one or more arrays, and do not achieve optimal query performance.

SUMMARY

Embodiments of a disclosed system, method and computer readable storage medium use de-duplication indexes on fields storing arrays (i.e., array fields) to perform database queries on records in a database. The system generates de-duplication indexes for array fields. The de-duplication indexes store unique entries corresponding to respective distinct values stored by the array fields, where a given unique entry identifies the records including the corresponding value for the corresponding array field. The system uses the de-duplication indexes to perform efficient queries specifying corresponding array fields.

In some embodiments a method is described for querying databases using de-duplication indexes is disclosed. A database system stores a collection of records comprising one or more fields, the one or more fields including an array field storing a value in an array for one or more records. The database system receives a query statement specifying the value stored by the array field from a client device. In executing the query statement, the database system determines a de-duplication index corresponding to the array field which includes a unique entry for the value. In particular, the unique entry includes one or more respective identifiers of the one or more records including the value. Using the de-duplication index, the database system retrieves a record of the one or more records including the value and provides the retrieved document to the client device.

In some embodiments a method is described for comparing de-duplication indexes and conventional indexes. The database system stores a collection of records including an array field which stores an array including a first and second instance of a value for a record. The database system generates a de-duplication index corresponding to the array field including a unique entry for the value. In particular, the unique entry includes an identifier for the record including the first and second instance of the value. The database system further generates a conventional index corresponding to the array field including a first and second entry for the first and second instance of the value, respectively. In particular, the first and second entries each include an identifier for the record including the first and second instance of the value. The database system receives a query statement specifying the value from the client device. In executing the query statement, the database system compares the de-duplication index and the conventional index using a set of optimization criteria. Based on the comparison, the database system selects the de-duplication index for executing the query. Using the de-duplication index, the database system retrieves the record including the value and provides the retrieved record to the client device.

In some embodiments, the database system generates a de-duplication index for multiple fields (i.e., a multi-field de-duplication index). In particular, the document-oriented database system may generate a de-duplication index corresponding to multiple array fields, scalar fields, object fields, or any combination thereof. In this case, the multi-field de-duplication index may include an individual child de-duplication index for each field used to create the multi-field de-duplication index.

In some embodiments, the database system uses multi-field de-duplication indexes to process database queries including multiple filters applied to fields separated by logical operators. In particular, the database system may use the multi-field de-duplication index by applying each filter to a child de-duplication index corresponding the field in parallel, and then applying the logical operators to the results from each child de-duplication index.

Figure 1:
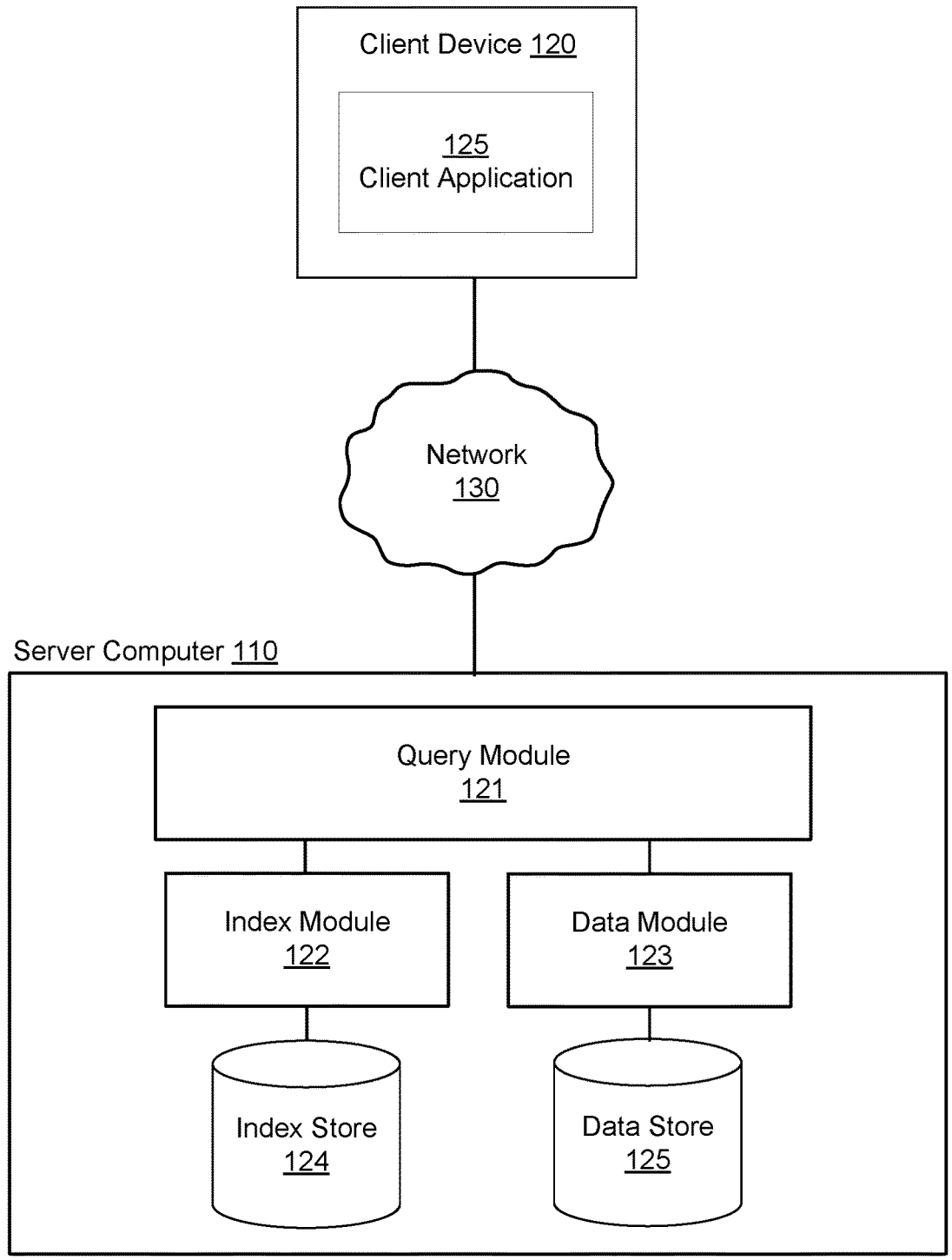
FIG. 1 is a block diagram of a document-oriented database system environment for performing database queries, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

System Environment

FIG. 1 is a block diagram of a document-oriented database system environment 100 for performing optimized database queries, according to one embodiment. The system environment includes a server computer 110, a client device 120, and a network 130. Other embodiments may use more or less or different systems than those illustrated in FIG. 1. Functions of various modules and systems described herein can be implemented by other modules and/or systems than those described herein.

The server computer 110 receives and processes document-oriented database queries. The server computer 110 includes a query module 121, index module 122, data module 123, index store 124, and data store 125. The term database query, as used herein, refers to a request to access or manipulate data stored by one or more fields in a collection of documents in a document-oriented database. Fields are discussed in greater detail below with reference to the index module 122. In response to receiving a database query, the server computer 110 retrieves the data requested in the query (e.g., stored in data store 125) and transmits the data over the network 130. The server computer 110 may be any computing device, including but not limited to: servers, racks, workstations, personal computers, general purpose computers, laptops, Internet appliances, wireless devices, wired devices, multi-processor systems, mini-computers, and the like. Although FIG. 1 shows a single element, the server computer 110 broadly represents one or multiple server computers, such as a server cluster, and the server computer may be located in one or more physical locations. The server computer 110 also may represent one or more virtual computing instances that execute using one or more computers in a datacenter such as a virtual server farm.

The query module 121 processes received database queries. In particular, the query module 121 retrieves the data requested by the query from the data store 125. The query module 121 may generate a query execution plan by parsing a received query. The term query execution plan (QEP), as used herein, refers to an ordered set of steps for accessing data stored in a database (e.g., data store 125). Based on the generated QEP, the query module 121 obtains indexes from the index module 122 and then fetches the data corresponding to the obtained query indexes from the data module 123. In some embodiments, the query module 121 generates the QEP using a cost-based optimizer. Indexes are described below in relation to the index module 122.

In some embodiments, the query module 121 receives requests to generate indexes for querying the data store 125, such as from the client device 120. The query module 121 may process the requests to generate indexes, such as by sending the request to the index module 122. In other embodiments, other components of the server computer 110 may receive and/or process requests to generate indexes. Requests to generate indexes are described in greater detail below with reference to FIG. 4.

The index module 122 generates indexes for document collections stored in the data store 125. In particular, the index module 122 may generate indexes for one or more fields storing data in the data store 125. The term field, as used herein, refers to an identifier of a group of data values that may be included in a collection of documents stored in the data store 125, where each document in the collection has one or more data values stored in association with a given field. For example, if the collection includes documents representing "users," each user document may include a "name" field which stores the relevant user's name. The fields storing data in the data store 125 may store data of multiple data types across different documents (i.e., not have a specific data type), such as strings, numbers, arrays, objects, etc. (e.g., JSON data types). In general, a field is not associated with a particular data type in a document-oriented database (unlike relational databases) because the collection which includes the documents does not have a predefined schema for the stored documents, as in relational databases. As described herein, fields may be scalar fields (i.e., store a single scalar value for a document), array fields (i.e., store an array of scalar values, additional arrays, or objects for a document), or object fields (i.e., store an object including one or more fields of any type for a document). Scalar values are described in detail below with reference to the data store 125. The index module 122 may generate indexes in response to the server computer 110 receiving new data for storage in data store 125 or receiving a request to generate or update an index for one or more fields. The index module 122 stores generated indexes in the index store 124. The index module 122 may also provide indexes to the query module 121 for executing a received query.

An index, as used herein, refers to a data structure that improves the speed of data retrieval for a query by logically organizing key values associated with one or more fields. The term key value, as used herein, refers to a data value stored by a field corresponding to an index which can be used to identify one or more documents (i.e., is included in a document for the relevant field). An index may include a set of index entries, where each entry associates one or more key values with one or more documents including the values. The entry may include an identifier of the one or more documents which can be used to locate the corresponding document in a database (e.g., the data store 125) such as a memory pointer, a string, a number, a Uniform Resource Identifier (URI), or a path. Indexes generated by the index module 122 may be represented using various data structures, such as B-trees, B+trees, hash maps, balanced trees, bitmaps, etc. Additionally, indexes generated by the index module 122 may include various internal representations of keys and document identifiers for various use-cases, such as primary indexes, secondary indexes, dense indexes, sparse indexes, etc. In particular, the index module 122 generates indexes which combine instances of the same key value stored by a field such that there is a unique entry for each key value that includes identifiers of multiple documents with the key value (i.e., de-duplication indexes). The index module 122 may additionally generate conventional indexes (e.g., SQL indexes, noSQL indexes, etc.) which include an entry for each instance of a key value and a document including the key value. For example, if document A and B include key value V, a conventional index includes an entry for document A and key value V and an entry for document B and key value V. A conventional index created for an array field may also include an entry for each instance of a key value in an array stored by a given document. For example, if document A includes an array with key values [V, V] a conventional index includes two entries for document A and key value V. Conventional indexes and de-duplication indexes, and particularly their application to fields storing arrays, are discussed in greater detail below with reference to FIGS. 4-7.

The data module 123 fetches data stored in data store 125 relevant to a received query. The data module 123 may use one or more indexes provided by the index module 122 to fetch documents containing the data requested by the received query. The retrieved documents may then be processed (e.g., by query module 121) in order to provide the specific data contained within the documents requested by the query. In other cases, the data module 123 may fetch the exact data requested by the query and provide the data to other components of the server computer 110.

The index store 124 stores indexes generated by the server computer 110 for data entries stored in the data store 125. In one embodiment, the index store 124 is integrated with the data store 125.

The data store 125 is a documented oriented database (e.g., a JSON, XML, or YAML database). In particular, the data store 125 stores collections of documents where each document in the collection includes a set of fields storing data values. For example, the data store 125 may include a collection of users, where each user is represented by a document that includes the fields: name, address, and age. In other embodiments, the data store 125 may be another type of database storing other types of records (e.g., relational databases). In one embodiment, the data store 125 is a JSON database. In this case, the data values stored in the data store 125 may be represented by any of the JSON scalar data types which include strings, numbers (e.g., integers, floating point values, etc.), Boolean values, and null values. The term scalar data, as used herein, refers to data consisting of a single value. Additionally, the data stored in the data store 125 may be represented by JSON objects and arrays, each of which may contain one or more scalar values, arrays, or objects. A document stored by data store 125 may be part of a collection of documents.

The client device 120 sends database queries for data stored at server computer 110. In particular, a client application 125 running on client device 120 sends requests to retrieve or update data (e.g., database queries) to the server computer 110 over the network 130. The client application 125 then receives data in response to the request from the server computer 110 sent back over the network 130. The data received in response may indicate to the client application 125 that the request was successfully executed, and may additionally include data specified in the request (e.g., one or more documents). Example client devices include personal computers (PCs), mobile phones, additional server computers, etc. Examples of client application 125 include browser applications and video games. The client device 125 may communicate with the server computer 110 through an Application Programming Interface (API) or a query language, e.g., structured query language (SQL). An example API the server computer 110 might provide is a Representation State Transfer (REST) API.

The server computer 110 and client device 120 shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. The server computer 100 stores the software modules storing instructions for embodiments, for example the query module 120.

The interactions between the client device 120 and the server computer 110 are typically performed via a network 130, for example, via the Internet. In one embodiment, the network uses standard communications technologies and/or protocols. Example networking protocol include the transmission control protocol/Internet protocol (TCP/IP), the user datagram protocol (UDP), internet control message protocol (ICMP), etc. The data exchanged over the network can be represented using technologies and/or formats including JSON, the hypertext markup language (HTML), the extensible markup language (XML), etc. In another embodiment, the entities can use custom and/or dedicated data communications technologies instead of, or in addition to, the ones described above. The techniques disclosed herein can be used with any type of communication technology, so long as the communication technology supports receiving by the document-oriented database system 100 of web requests from a sender, for example, a client device 120 and transmitting of results obtained by processing the web request to the sender.

System Architecture

Figure 2:
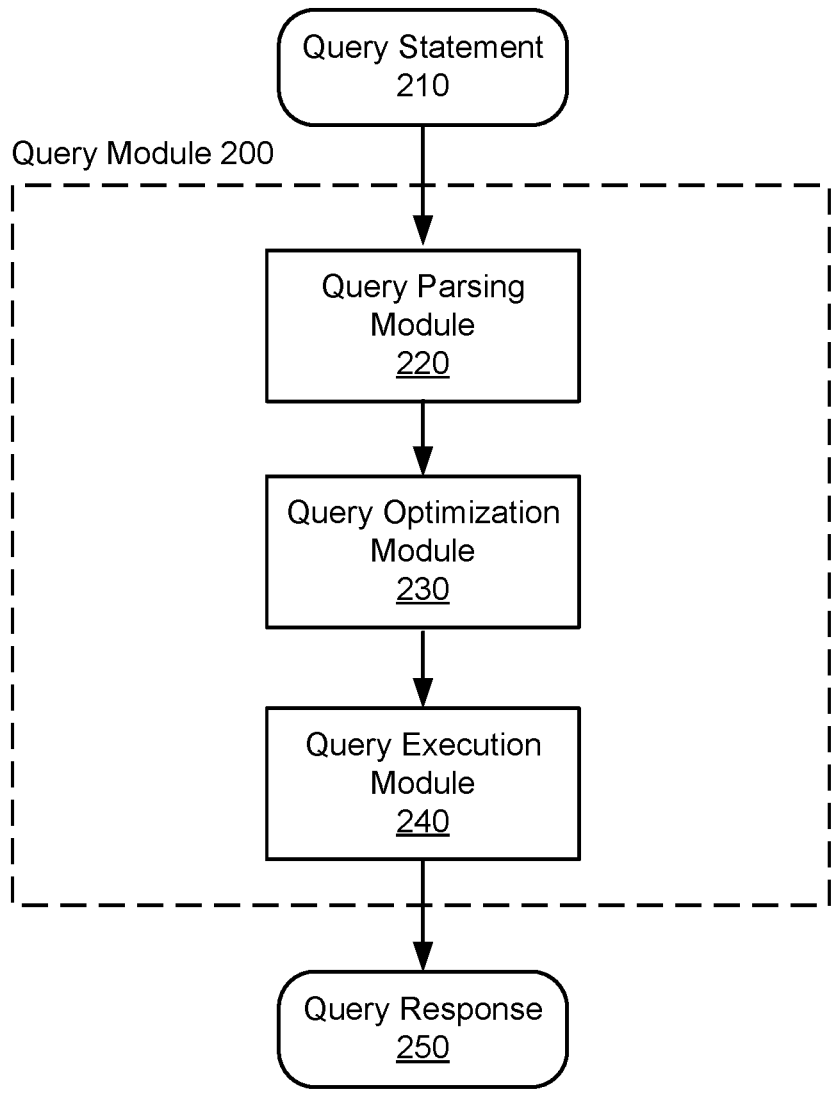
FIG. 2 is a block diagram illustrating the architecture and data flow of a query module for performing optimized document-oriented database queries, according to one embodiment.

FIG. 2 is a block diagram illustrating the architecture and data flow of a query module 200 for performing database queries, according to one embodiment. The query module 200 may be an embodiment of the query module 110 in FIG. 1. The query module 200 consists of a query parsing module 220, a query optimization module 230, an optimization statistics module 225, an optimization statistics store 226, and a query execution module 240. Other embodiments can have different and/or other components than the ones described here. Furthermore, the functionalities described herein can be distributed among the components in a different manner.

The query parsing module 220 receives and parses a query statement 210 in order to fetch or update data stored by one or more untyped fields requested by the query. The query parsing module 220 then provides a parsed representation of the query statement 210 to the query optimization module. The query statement 210 is a request to retrieve or manipulate (e.g., update) the data stored by one or more data fields in the documents of one or more collections contained in the data store 125. The query statement 210 may be a set of commands associated with a particular API or query language (e.g., SQL, noSQL, N1QL, etc.). The query statement 210 may include one or more commands which specify the one or more fields, and additionally may include and one or more filters usable to select certain data values stored by the one or more fields. The query statement 210 may be represented using a particular API or query language (e.g., SQL, noSQL, N1QL, etc.). For example, the query statement 210 may request a set of user documents containing a field storing a particular value (e.g., user birthday=February $10^{th}$). If the query statement 210 is represented using SQL, the query statement 210 may include SQL commands such as SELECT, INSERT, UPDATE, DELETE, MERGE, UPSERT, etc. Similarly, the query statement 210 may include SQL predicate filters such as "=" (equals)", "!=" (does not equal), ">" (is greater than), "<" (is less than), EXISTS, BETWEEN x AND y, IN, ALL, ANY, SOME, etc. Furthermore, the query statement 210 may include logical operators between statements and/or filters, such as AND or OR between filters applied to document fields. For example, the query statement 210 may request documents where a field A=5 OR a field B=3. One skilled in the art will recognize that many variations of query statement 210 are possible using various query languages.

In some embodiments, the query statement 210 may specify one or more indexes to select from for executing the query. For example, the query statement 210 may include an identifier of a particular index (e.g., a name of the index) stored in the index store 124 to use for indexing the query. As another example, the query statement 210 may include identifiers of multiple indexes which are each usable to execute the query (e.g., a de-duplication index and a conventional index), and the query optimization module 230 may select one of the indexes to use for executing the query. Index selection is discussed in greater detail below with reference to FIG. 5.

The query optimization module 230 receives a parsed query statement and generates a QEP in order to execute the query. The query optimization module 230 may obtain a set of indexes (e.g., from the index module 122) usable to execute the query statement. For example, the query optimization module 230 may obtain a set of indexes including indexes created using one or more fields specified by the query statement and/or indexes of various types (e.g., de-duplication indexes, conventional indexes, etc.). Using the parsed query statement and the obtained indexes, the query optimization module 230 may generate a set of logically equivalent QEPs. Furthermore, the query optimization module 230 may select an optimal QEP from the set of logically equivalent QEPs to be used to execute the query. For example, two QEPs may include filters on data that are logically equivalent, such as the filters "field value=X" and "field value includes X." After selecting the optimal QEP, the query optimization module 230 provides the optimal QEP to the query execution module 240. Selection of an optimal QEP is described in greater detail below with reference to FIG. 5.

In some embodiments, the optimal QEP may be selected based on a set of optimization criteria. For example, optimization criteria may include a set of rules for generating QEPs, such as an order in which filters are applied, which logical operators to use, and any other applicable rules used to optimize query execution in document-oriented or relational databases. In the same or different embodiments, the optimization criteria may identify an optimal QEP based on execution costs determined for individual QEPs in the set of logically equivalent QEPs. For example, QEPs may be costed, and an optimal QEP may be selected, using any of the methods described in co-pending U.S. patent application Ser. No. 16/788,923, filed Feb. 12, 2020, which is incorporated herein by reference in its entirety. In one embodiment, each QEP is represented by an ordered sequence of operators, where each operator describes instructions for a specific operation on the indexes, keys, or data stored in the index store 124 or data store 125. For example, operators may fetch data values stored by a field using keys corresponding to those data values, scan indexes, scan keys included in indexes, join data across multiple documents in a collection, etc. In this case, the query optimization module 230 may determine the cost of individual operators based on the optimization statistics. The optimization statistics may include various statistics corresponding to the indexes, documents, and fields of a collection usable to determine the number of documents accessed by a step in the QEP.

The query execution module 240 receives the optimal QEP from the query optimization module 230 and performs the instructions encoded in the optimal QEP to obtain query results (e.g., one or more documents). After performing the instructions, the query execution module 240 outputs the query response 250, which the server computer 110 further processes (e.g., sends to client device 120). The query execution module 240 may provide instructions to the index module 122 in order to fetch indexes or keys relevant to the data specified in the QEP. Additionally, the query execution module 240 may provide instructions to the data module 123 for fetching or manipulating the data specified in the QEP. In some embodiments, the query execution module 240 first retrieves one or more documents including the data specified in the QEP and then performs the operations on the retrieved documents encoded in the QEP. For example, if the QEP is a request for data, the query execution module 240 may filter the documents for the data specified in the QEP, aggregate the filtered data, sort the filtered data, and finally store the filtered data in the query response 250.

The query response 250 represents data generated or retrieved by the query module 200 in response to the query statement 210. For example, if the query statement 210 requests documents including a value stored by a particular field in the data store 125, the query response 250 will include the requested document. Additionally, the query response 250 may include metadata describing the operations performed by the query module 200 in executing the query statement 210. For example, if the query statement 210 requested that some data in data store 125 be deleted, the query response 250 may convey whether the delete operation was successful or unsuccessful (e.g., the data could not be found).

Figure 3:
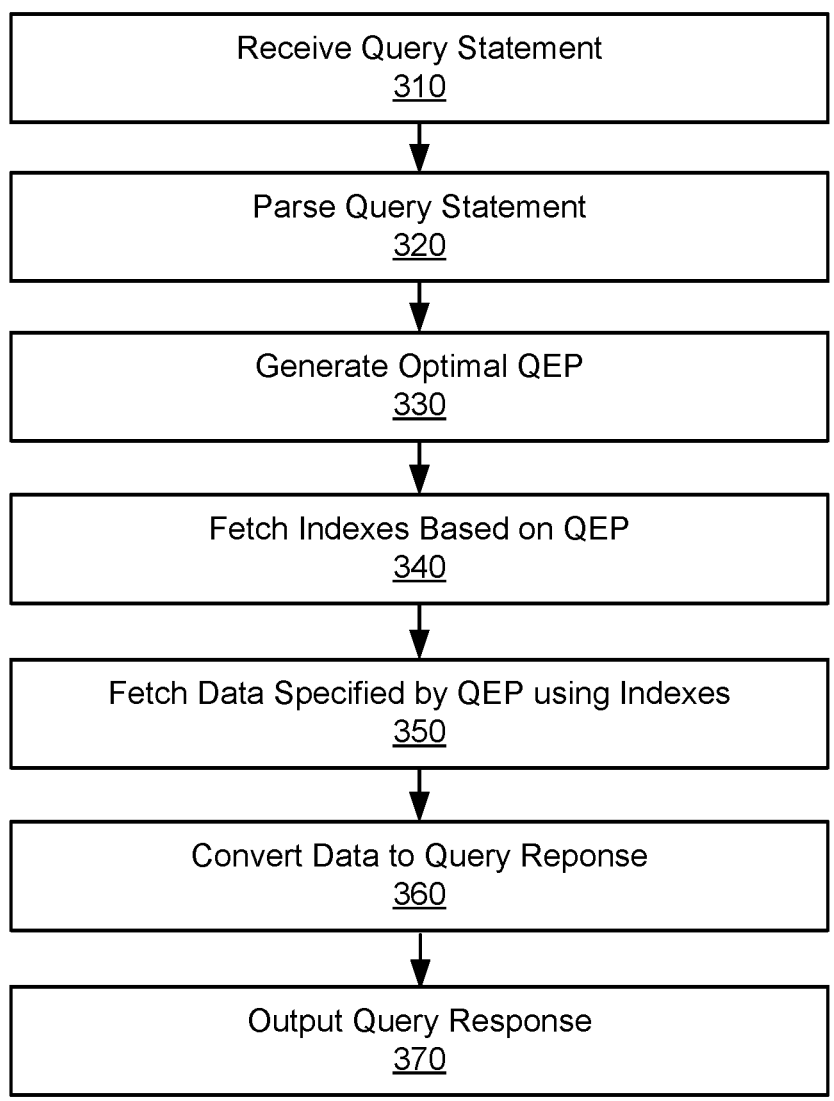
FIG. 3 is a flow chart illustrating a process for performing optimized document-oriented database queries by a document-oriented database system, according to an embodiment.

FIG. 3 is a flow chart illustrating a process 300 for performing optimized document-oriented database queries by the document-oriented database system 100, according to an embodiment. The process 300 begins with the document-oriented database system 100 receiving 310 a query statement directed at querying data in a document-oriented database stored by the document-oriented database system 100 (e.g., data store 125), such as the query statement 210. The document-oriented database system 300 parses 310 the received query statement in order to identify the set of steps implicit in the query statement (e.g., using the query parsing module 220). Based on the parsed query statement, the document-oriented database system 100 generates 300 an optimal QEP.

Having generated an optimal QEP, the document-oriented database system 100 fetches 340 indexes for executing the optimal QEP. For example, the query execution module 240 may retrieve indexes from the index store 124 corresponding to fields specified in the optimal QEP using the index module 122. Using the retrieved indexes and the optimal QEP, the document-oriented database system 100 fetches 350 the data (e.g., documents). For example, the query execution module 240 may fetch the data from the data store 125 using the data module 123. The document-oriented database system may also perform additional operations after fetching the data, such as updating, deleting, combining, or otherwise manipulating the data. After fetching and processing the data, the document-oriented database system 100 converts 360 the data to a query response and finally outputs 370 the query response to the system or device which submitted the query statement. For example, the query execution module 240 may output the query response 250 to client device 120.

Other entities may perform some or all the steps of the process 300 in other embodiments. Likewise, embodiments may include different and/or additional steps, or perform the steps in different orders.

De-Duplication Indexes and Conventional Indexes

Figure 4:
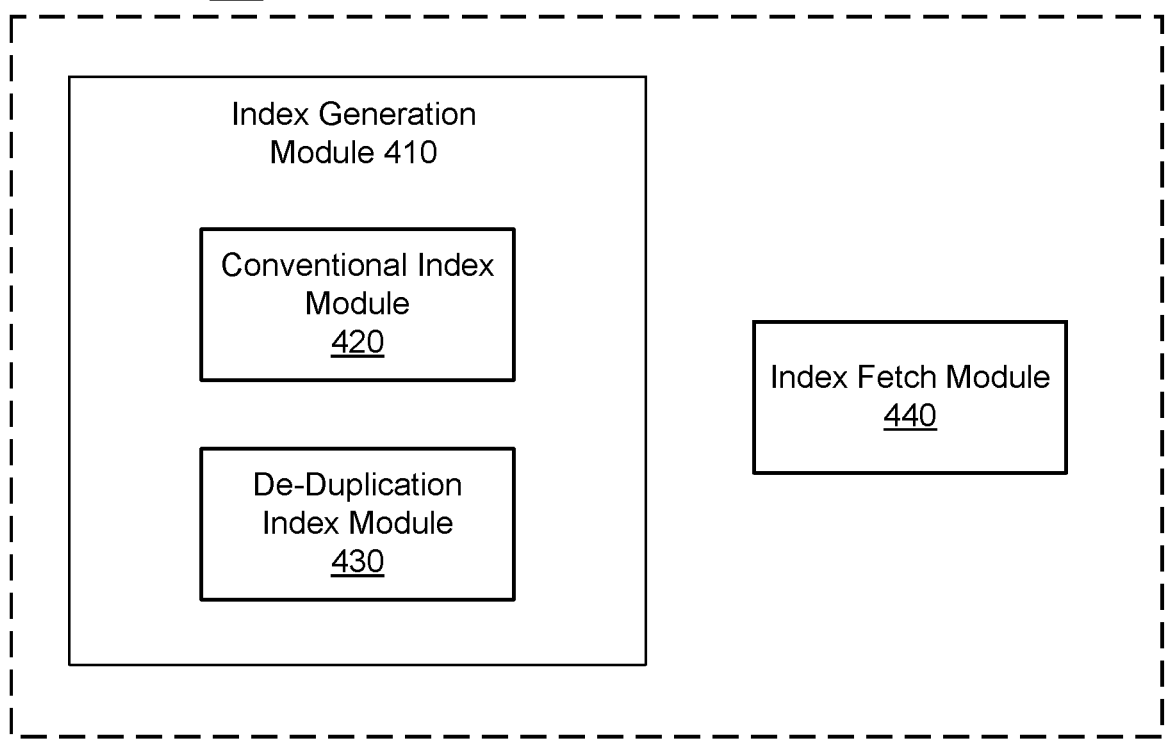
FIG. 4 is a block diagram illustrating the architecture of an index module, according to one embodiment.

FIG. 4 is a block diagram illustrating the architecture of an index module, according to one embodiment. The index module 400 may be an embodiment of the index module 122 depicted in FIG. 1. The index module 400 consists of an index generation module 410 and an index fetch module 440. The index generation module 410 includes a conventional index module 420 and a de-duplication index module 430. Other embodiments can have different and/or other components than the ones described here. Furthermore, the functionalities described herein can be distributed among the components in a different manner.

The index generation module 410 generates indexes for querying collections of documents stored in a document-oriented database (e.g., the data store 125). The index generation module 410 may create indexes of various types using various representations, as described above in relation to the index module 122. For example, indexes generated by the index generation module 410 may be represented as B-trees, B+trees, T-trees, O2-trees, red-black trees, hash maps, and any other data structure which can be used to represent database indexes. In particular, the index generation module 410 generates conventional database indexes and de-duplication indexes, as described below with reference to the conventional index module 420 and the de-duplication index module 430, respectively. In other embodiments, the index generation module 410 may generate only de-duplication indexes.

The index generation module 410 may generate and/or update indexes for collections of documents in response to receiving requests (e.g., a request from the client device 120 or a request from another component of the server computer 110). In this case, a request to generate an index may specify one or more fields storing data in the documents of a collection and/or the type of index to create. A request to generate an index may additionally specify whether one or more of the fields used to create the index stores arrays, and if so to generate an index specific to array fields (i.e., an array index). An array index may facilitate queries on indexes including filters unique to arrays, such as the SQL query statements on array fields including ANY, ANY AND EVERY, UNNEST, INNER JOIN, LEFT OUTER JOIN, and RIGHT OUTER JOIN.

The index generation module 410 may generate indexes of a certain type and/or using a certain representation depending on whether one or more of the fields used to create the index stores scalar values or arrays. For example, the index generation module 410 may generate de-duplication indexes for array fields by default. As another example, the index generation module 410 may generate indexes of a set of index types in response to a request (e.g., generate both a de-duplication index and a conventional index for one or more fields specified in a request). Additionally, or alternatively, the index generation module 410 may generate indexes automatically (e.g., after new documents are added to the document-oriented database).

The conventional index module 420 generates conventional indexes for querying documents stored in the document-oriented database. As described above with reference to the index module 122, the entries of a conventional index include a single document identifier corresponding to one or more key values. For example, a conventional index might include the entry "5: D1" where "5" is a key value stored by a field in one or more documents and "D1" is an identifier of one of the one or more documents (e.g., a primary index of the document or a pointer to the document). The conventional index module 420 may generate conventional indexes for fields storing both scalars and arrays. In particular, the conventional index module 420 may generate conventional indexes which include duplicate entries for key values stored by a field corresponding to the conventional index, each entry from the duplicate entries created for a different occurrence of the key value. The conventional index module 420 may store generated conventional indexes in an index database (e.g., the index store 124).

A conventional index created for one or more fields may include an individual entry for each distinct pair of key values and a corresponding document including the key values (i.e., stored in corresponding fields). For example, if the key value is the integer "5" stored by a field A for a collection of documents (D1, D2, D3, etc.), the entries might be "5: D1," "5: D2," "5: D3," etc. If a conventional index is created for an array field, the conventional index may include entries for all instances of a key value in an array stored by the array field. For example, if a document stores the array field "A: [5, 5, 5]," the conventional index module 420 may create a conventional index including an entry for each "5" in the A array (i.e., three entries of "5: D1"). An example internal representation of a conventional index for an array field is described in greater detail below with reference to FIG. 6.

In some embodiments, the conventional index module 420 receives a request to generate an index on multiple fields (i.e., a multi-field index). In this case, the conventional index module may generate multi-field conventional index including an entry for each combination of values stored in the multiple fields. For example, a request to generate an index may specify a field A which stores the integer 5 for document D1 and document D2, and a field B which stores the string 'word 1' for D1 and D2. Then the conventional index module 420 may create a multi-field conventional index on fields A and B including the entries "(5, 'word 1'): D1" and "(5, 'word 1'): D2".

Furthermore, the number of entries in a conventional index created on multiple array fields may increase significantly as additional fields are added, leading to a severe impact on performance when executing queries using multi-field conventional indexes. For example, for a request to generate an index on array fields A and B including an array with N and M elements, respectively, the query module 121 generates a conventional index including N multiplied by M entries. Given that a collection may include many documents including arrays with many values (e.g., hundreds, thousands, millions, etc.), the number of entries in a multi-field conventional index on one or more array fields can become enormous. As such, the index module 420 may not permit requests to create an index on multiple fields including an array field (e.g., may respond indicating the request cannot be completed). As a result of only permitting the creation of conventional indexes for individual array fields, when executing queries including multiple filters applied to array fields the query module 121 may only be able to apply one filter to an array field at a time, and there may be an enforced ordering in which the folders can be applied. Alternatively, the query module 121 may apply multiple filters at once to respective distinct conventional indexes and then perform an additional step of identifying the intersection of the index results. Both of these techniques are resource demanding and inefficient.

The de-duplication index module 430 generates de-duplication indexes for querying documents stored in the document-oriented database. The de-duplication index module 430 may generate de-duplication indexes for fields storing both scalars and arrays. In particular, unlike the conventional indexes described above, the de-duplication index module 430 generates de-duplication indexes which include unique entries for distinct key values stored by a field corresponding to the index. The de-duplication index module 430 may generate de-duplication indexes for fields storing both scalars and arrays. The de-duplication index module 430 may store generated de-duplication indexes in an index database (e.g., the index store 124).

A de-duplication index created for a field includes a unique entry for distinct key values stored by the field, where an entry includes a key value and a set of identifiers of documents including the value in association with the field. For example, if the key value was the integer "5" stored in an "age" field for three "user" documents, the unique entry for the key value might be "5: [D1, D2, D3]." Furthermore, if a de-duplication index is created for an array field where a document includes multiple instances of a key value in an array stored by the array field, the de-duplication index may include a single, unique entry for all of the instances of the key value. For example, if a document stores the array field "scores: [5, 5, 5]," the de-duplication index may include a unique entry for "5" (i.e., a single entry of "5: [D1]"). An example internal representation of a de-duplication index for an array field is described in greater detail below with reference to FIG. 6.

In some embodiments, the de-duplication index module 430 receives a request to generate a multi-field de-duplication index. In this case, the de-duplication index module 430 may generate a multi-field de-duplication index including individual de-duplication indexes for each field (i.e., child de-duplication indexes). For example, if a request to generate an index specifies an array field A and an array field B, the de-duplication index module 430 may generate a multi-field de-duplication index including a first child de-duplication index for array field A and a second child de-duplication index for array field B. In this way, for each additional field used to create a multi-field de-duplication index, the number of entries in the de-duplication index increases only based on the size of an individual de-duplication index for the additional field, rather than multiplicatively as described above for multi-field conventional indexes.

The index fetch module 440 facilitates retrieval of indexes for executing queries. The index fetch module 440 may determine one or more indexes which can be used to execute a query (e.g., by the query module 121). In particular, the index fetch module 440 may receive identifiers of one or more filters and one or more fields from the query module 121 and identify one or more indexes usable to apply the filters to the fields (i.e., qualified indexes). The index fetch module 440 may provide the qualified indexes (e.g., to query module 121) to be used to generate QEPs. The qualified indexes provided by the index fetch module 440 may include the actual indexes (e.g., the index data structures), or may instead include metadata describing the indexes (e.g., fields corresponding to the indexes, number of entries in the indexes, key value range of the indexes, etc.). Additionally, the index fetch module 440 may provide the actual indexes needed to facilitate the execution of a QEP. For example, the query module 121 may request indexes from query module 400 specified in a QEP when executing the QEP.

In some embodiments, the index fetch module 440 identifies indexes of various types corresponding to the same fields (e.g., a conventional index and a de-duplication index). In this case, the index fetch module 440 may identify a conventional index for each array field relevant to a query (e.g., a conventional index created on an array field A and a conventional index created on an array field B). Additionally, or alternatively, the index fetch module 440 may identify one or more multi-field de-duplication indexes corresponding to multiple fields relevant to the query (e.g., a multi-field de-duplication index created on array field A and array field B). The index fetch module 440 may provide each of the qualified indexes of various types to the query module 121. Methods for selecting an index from one or more equivalent indexes is discussed in greater below with reference to FIG. 5.

Figure 5:
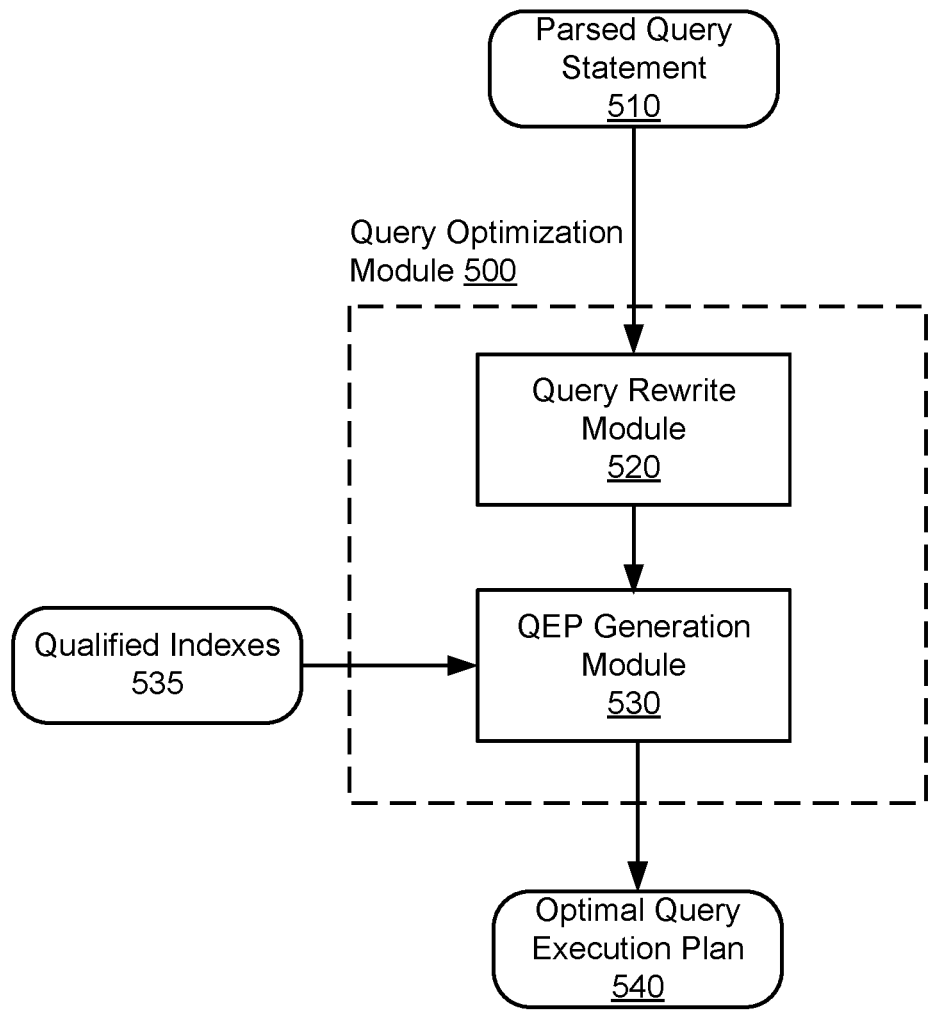
FIG. 5 is a block diagram illustrating the architecture and data flow of a query optimization module, according to one embodiment.

FIG. 5 is a block diagram illustrating the architecture and data flow of a query optimization module 500, according to one embodiment. The query optimization module 500 may be an embodiment of the query optimization module 230 depicted in FIG. 2. The query optimization module includes a query rewrite module 520 and a query execution plan (QEP) generation module 530. The query optimization module 500 receives a parsed query statement 510 and outputs an optimal QEP 540 for executing the query (e.g., by the query module 120). Other embodiments can have different and/or other components than the ones described here. Furthermore, the functionalities described herein can be distributed among the components in a different manner.

The query rewrite module 520 rewrites a received parsed query statement 510 to produce an optimal equivalent parsed query statement. In one embodiment, the query rewrite module 520 rewrites the parsed query statement 510 based on rules associated with a set of optimization criteria. For example, applying filters to query data stored by two fields A and B may logically be done in any order to achieve the same result, but there may be a performance difference depending on which of the fields A and B are queried using the respective filters first. In this case, the query rewrite module 500 includes rules corresponding to the filters used to filter A and B, and/or corresponding to the fields A and B themselves, designed to select a query order with the best performance.

In the same or different embodiment, the query rewrite module 520 performs a cost-based rewrite of the parsed query statement 510. For example, when querying the two fields A and B the query rewrite module 520 may determine the cost of applying filter A to field A first and the cost of applying filter B to field B first. Based on the determined costs, the query rewrite module 520 rewrites the parsed query statement 510 to apply filter A to field A and filter B to field B in the order with the lowest cost. Furthermore, the query rewrite module 520 may rewrite the parsed query statement 510 using a combined rule based and cost-based approach. For example, commands for which system performance is highly dependent on the state of the database may be rewritten based on determined costs, while commands with performance that is relatively unaffected by the state of the database may be rewritten based on predefined rules.

The QEP generation module 530 receives a re-written parsed query statement from the query rewrite module 520 and generates a corresponding QEP. In particular, the QEP generation module 530 obtains a set of qualified indexes 535 which can be used to execute the re-written parsed query statement. For example, the QEP generation module 530 may provide information describing the re-written parsed query statement to the index module 400, and receive the qualified indexes 535 from the index module 400 based on the identified information. The qualified indexes 535 may include the actual indexes (e.g., the index data structures), or may instead include metadata describing the indexes (e.g., fields corresponding to the indexes, number of entries in the indexes, key value range of the indexes, etc.). Using the qualified indexes 535 and the re-written parsed query statement, the QEP generation module 530 may identify a set of logically equivalent QEPs. In this case, the QEP generation module 530 may select the optimal QEP 540 from the set of logically equivalent QEPs. The optimal QEP may use one or more indexes of various types to execute the query, such as one or more de-duplication indexes and/or conventional indexes.

In some embodiments, the qualified indexes 535 include indexes of various types corresponding to the same fields, as discussed above in relation to FIG. 4. For example, the qualified indexes 535 may include both a conventional index and a de-duplication index for a field A. In this case, the QEP generation module 530 may select one type of index (e.g., the de-duplication index) instead of indexes of one or more other types (e.g., the conventional index) when generating the optimal QEP 540. For example, the qualified indexes 535 may include both a de-duplication index and a conventional index for an array field A. Furthermore, the array field A may store an array [1, 1, 1] in a document D, such that the conventional index includes three entries associating the key value "1" with the document D, while the de-duplication index includes only a single, unique entry associating the key value "1" with the document D. As such, the QEP generation module 530 may select the de-duplication index instead of the conventional index based on performance benefits provided by the fewer number of entries, such as for executing a query to retrieve document D using a filter on array field A. In other cases, the conventional index may provide improved or commensurate performance relative to the de-duplication index, such as when the arrays stored by an array field include no duplicate key values.

In some embodiments, the QEP generation module 530 generates the optimal QEP based on a set of optimization criteria, such as described above in relation to the query optimization module 230. In this case, the QEP generation module 530 may select one or more indexes from the qualified indexes 535 based on rules specified by the set of optimization criteria. For example, the optimization criteria may include a rule to select an index with the fewest entries from two or more indexes each usable to apply a filter to a field (e.g., a conventional index and a de-duplication index created on the same field).

In some embodiments, the QEP generation module 530 may generate an optimal QEP based on execution costs determined for individual QEPs in a set of logically equivalent QEPs, as described above in relation to the query module 230. For example, the QEP generation module 530 may select the QEP with the lowest cost to be the optimal QEP. The QEP generation module 530 may assign costs to QEPs based on database statistics describing a collection of documents relevant to the QEP. These statistics may describe the overall collection (e.g., total number of documents), the indexes created on fields in the collection (e.g., the number of index entries), and the distribution of values stored in the fields (e.g., the number of values in a particular range). Methods for generating database statistics and using the statistics to determine QEP costs are discussed in U.S. patent application Ser. No. 16/788,923, referenced above in relation to the query module 230. The QEP generation module 530 may determine the cost of a given QEP based on one or more indexes used by the QEP. For example, the QEP generation module 530 may determine for a QEP a first cost when using a given conventional index and a second cost when using a given a de-duplication index. In particular, the QEP generation module 530 may use database statistics to estimate or determine the number of documents which a given index will identify based on a filter, which can then be used to assign a cost to the index. Based on the costs, the QEP generation module 530 may select either the conventional index QEP or the de-duplication index QEP as the optimal QEP.

In some embodiments, the parsed query statement 510 includes multiple filters applied to respective fields separated by logical operators (e.g., AND, OR, NOT, etc.). In this case, the QEP generation module 510 may generate an optimal QEP which uses a multi-field de-duplication index including a first de-duplication index created on the first field and a second de-duplication index created on the second field, where the optimal QEP applies the first de-duplication index to the first filter and the second de-duplication index to the second filter. As described above with reference to FIG. 4, the multi-field de-duplication index may have been created based on a single request to generate an index for both. The optimal QEP may then be used to retrieve documents including values specified by both the first filter stored by the first field or the second filter stored by the second field. In particular, the multi-field de-duplication index may be used by respectively applying the first and second filters to the first and second de-duplication indexes in parallel, and obtaining index results for each individual filter. Then, the results for each filter may be processed to obtain the overall multi-field index results by applying any relevant logical operators to the combined results. In some embodiments, the results for each filter may be represented using a bitmap, allowing the logical operators to be applied using bitwise operators. Furthermore, the bitmap may be compressed (i.e., a compressed bitmap) in order to further improve query efficiency.

As such, executing a query on multiple fields using a multi-field de-duplication index does not require applying one filter at a time in a particular order or post-processing overlapping index results from multiple distinct indexes, as described above for conventional indexes. Additionally, a multi-field de-duplication index created on multiple fields may be used to execute a query on a subset of the multiple fields. For example, a multi-field index created on fields A and B can be used for queries on only field A, only field B, and both fields A and B. In contrast, conventional indexes may only be used to execute queries including all of the fields used to create the conventional index. Using a multi-field de-duplication index to execute a query is described in greater detail below with reference to FIGS. 7A-7B. Although the example described herein uses only two filters, a de-duplication index may be created for any number of fields, and furthermore may be used to execute queries including any number of filters applied to the relevant fields.

Figure 6:
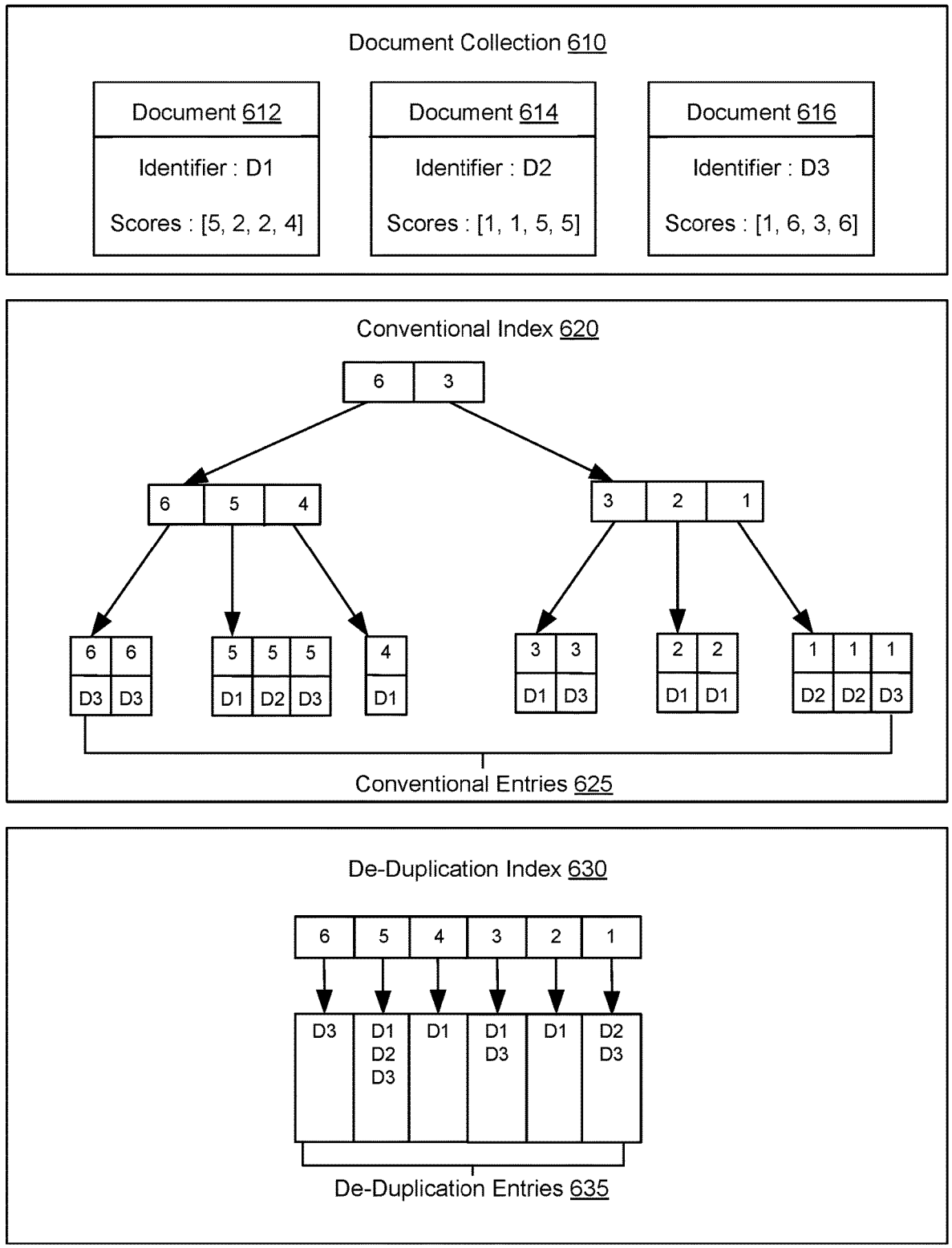
FIG. 6 illustrates representations of a conventional index and a de-duplication index for an array field in a set of documents, according to one embodiment.

FIG. 6 illustrates representations of a conventional index 620 and a de-duplication index 630 for an array field of a document collection 610, according to one embodiment. In particular, the document collection 610 consists of three documents, document 612, document 614, and document 616. Each of the three documents includes an array stored by the array field "scores," as well as a respective document identifier (i.e., D1, D2, D3) which can be used to identify the respective document in an index.

The conventional index 620 is an index created on the scores field of the document collection 610. As depicted, the conventional index 620 is represented as a tree (e.g., a B-tree), although the conventional index 620 may be represented using any of the data structures for representing indexes described above. The conventional index 620 includes conventional entries 625 which each comprise a key value stored by the scores field and an identifier of a corresponding document including the key value in an array stored by the scores field. In particular, the conventional entries 625 include an entry for each instance of a key value stored by the scores array field in the document collection 610. For example, the conventional entries 625 include an entry for both instances of "2" in the scores array stored by Document 612.

The de-duplication index 630 is an index also created on the scores field of the document collection 610. As depicted, the de-duplication index 630 is also represented as a tree (e.g., a B-tree), although the de-duplication index 630 may also be represented using any of the data structures for representing indexes described above. The de-duplication index 630 includes de-duplication entries 635 which each comprise a key value stored by the scores field and a list of document identifiers corresponding to documents including the key value in an array stored by the scores field. In particular, the de-duplication index 630 includes a unique entry for unique key values stored by the scores array in the document collection 610. For example, the de-duplication entries 635 include a single entry for both instances of "2" in the scores array stored by Document 612.

Figure 7A:
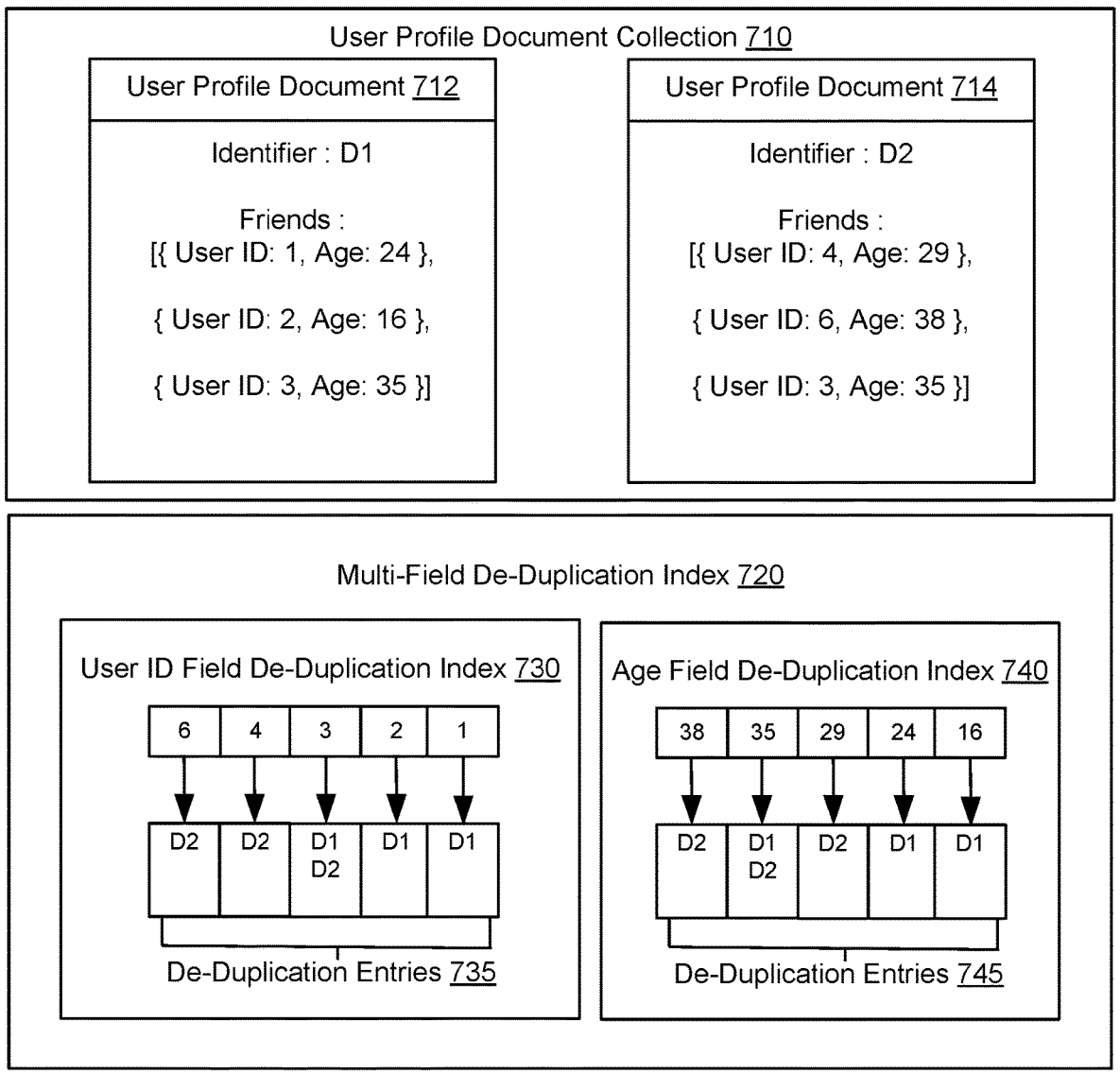
FIG. 7A illustrates representations of a multi-field de-duplication index for an array field in a set of documents, according to one embodiment.

FIG. 7A illustrates representations of a multi-field de-duplication index 720 for an array field in a set of user profile documents, according to one embodiment. In particular, the user profile document collection 710 includes two user profile documents, user profile document 712 and user profile document 714. Both user profile document 712 and 714 include an array of user objects stored by the array field "friends," as well as a respective document identifier (i.e., D1 and D2) which can be used to identify the respective document in an index.

The multi-field de-duplication index 720 is a de-duplication index created on multiple fields, namely the user ID scalar field and the age scalar field nested within the user objects stored in arrays by the friends array field (e.g., "friends.user_ID" and "friends.age"). In other examples, the multiple fields used to create the multi-field de-duplication index 720 may include any number of other array fields, scalar fields, or object fields. The multi-field de-duplication index 720 includes index filter layers 725, a user ID de-duplication index 730 for the user ID scalar field and an age field de-duplication index 740 for the age scalar field. Accordingly, the user ID field de-duplication index 730 includes the de-duplication entries 735, which each comprise a key value stored by the user ID field and a list of document identifiers corresponding to documents including the key value in a user object in an array stored by the friends array field. Similarly, the age field de-duplication index 740 includes the de-duplication entries 745, which each comprise a key value stored by the user ID field and a list of document identifiers corresponding to documents including the key value in a user object in an array stored by the friends array field.

Figure 7B:
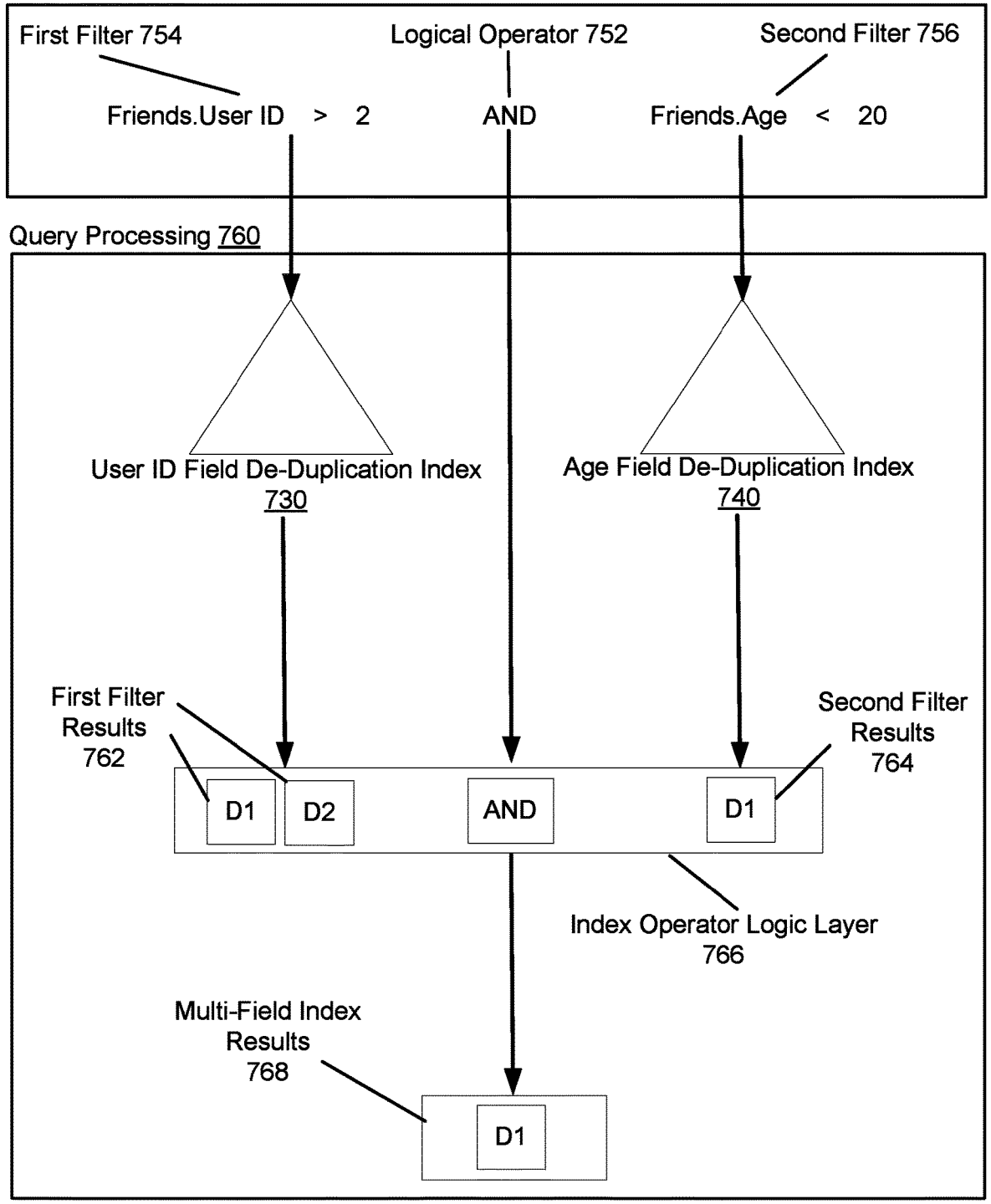
FIG. 7B illustrates execution of a query using the multi-field de-duplication index depicted in FIG. 7A, according to one embodiment.

FIG. 7B illustrates execution of a query 750 on multiple fields using the multi-field de-duplication index 740 depicted in FIG. 7A, according to one embodiment. The multi-field query 750 is a query on the user profile document collection 710 depicted in FIG. 7A. In particular, the query 750 is a request for documents where the friends array field stores user objects with a user ID greater than two or an age less than twenty. The query 750 includes a first filter 754 (i.e., "user ID's greater than two") applied to the user ID field and a second filter 756 applied to the age field (i.e., "ages less than twenty). The first filter 754 and the second filter 756 are separated by the logical operator 752, which in the example depicted in FIG. 7B is an "AND" logical operator. In other examples, the logical operator 752 may be any other logical operator. Although the query 750 could be represented using any query language usable to query array fields, the syntax of query 750 as depicted in FIG. 7B is for the purposes of illustration only (i.e., a pseudo-code representation) and does not correspond to any particular query language.

The query processing 760 depicts the process of applying the multi-field de-duplication index 720 to retrieve the requested documents based on the multi-field query 750. As depicted in FIG. 7B, the query processing 760 begins with the application of the first filter 754 and the second filter 756 to the user ID de-duplication index 730 and the age field de-duplication index 740, respectively. Based on the first filter 754, the user ID de-duplication index 730 provides first filter results 762. Given that both user profile document 712 and user profile document 714 include user objects with a value for the user ID field greater than two, the first filter results 762 includes the identifiers of both user profile documents, D1 and D2. Similarly, based on the second filter 756, the age de-duplication index 740 provides second filter results 764. Given that only user profile document 712 includes a user object with a value for the age field less than twenty, the second filter results 764 includes only the identifier of user profile document 712, D1. In some embodiments, the first results 762 and the second filter results 764 are represented using respective bitmaps.

The index operator logic layer 766 applies the logical operators included in the multi-field query 750 (i.e., logical operator 752) to the first filter results 762 and the second filter document results 764. In the example depicted in FIG. 7B, the result of applying the logical AND operator 752 to the first 762 and second 764 filter results is the identifier of user profile document 712, D1, as included in the multi-field index results 768. In other words, only user profile document 712 includes an array stored by the friends array field with a user object where the user ID is greater than two and a user object where the age is less than twenty. In embodiments where the first filter results 762 and the second filter results 764 are represented using respective bitmaps, as described above, the multi-field index results 768 may be determined by applying bitwise operations corresponding to logical operator 752 to the respective bitmaps. In particular, the logical operator 752 may be applied to the bitmap of the first filter results 762 and the bitmap of the second filter results 764 in order to evaluate the logical operator 752 and determine the multi-field index results 768.

Selecting Optimal Indexes for Queries on Arrays

Figure 8:
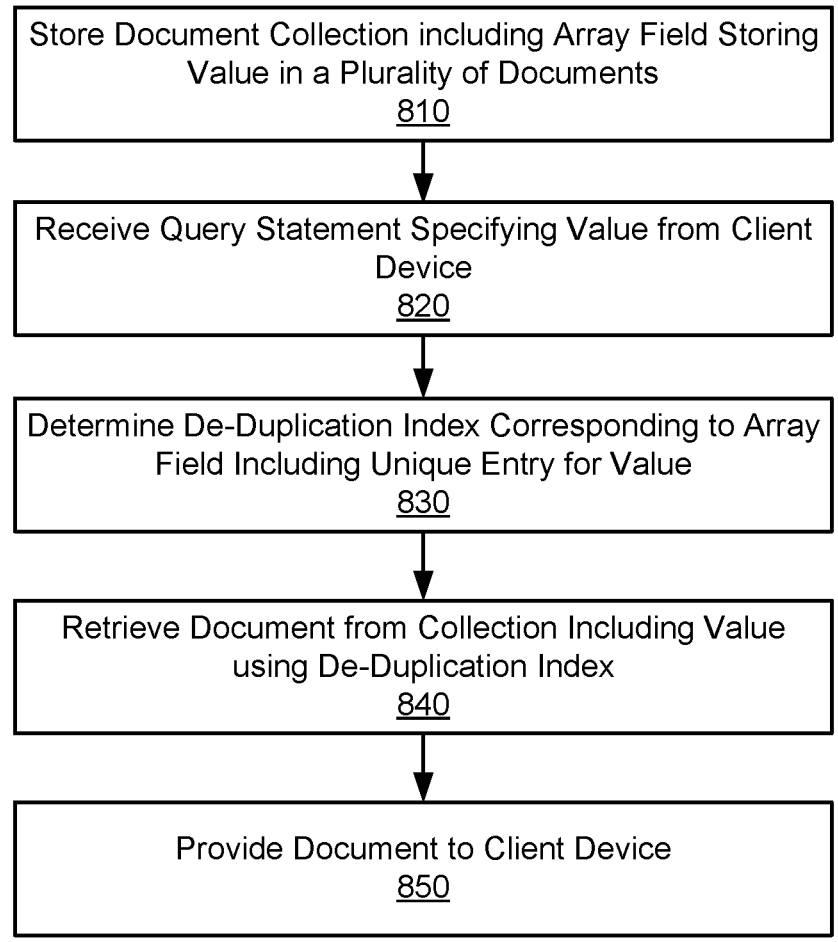
FIG. 8 is a flow chart illustrating a process for querying a document-oriented database using a de-duplication index, according to an embodiment.

FIG. 8 is a flow chart illustrating a process 800 for querying a document-oriented database using a de-duplication index, according to an embodiment. The process 800 shown in FIG. 8 may be performed by components of a document-oriented database system (e.g., the server computer 110). Other entities may perform some or all of the steps in FIG. 8 in other embodiments. Embodiments may include different and/or additional steps or perform the steps in different orders.

The server computer 110 stores 810 a collection of documents including an array field which stores a value included in a plurality of documents. In particular, each of the plurality of documents includes a respective array stored by the array field containing the value. The value may be a particular scalar value in arrays including one or more scalar values. The server computer 110 may store the collection of documents in the data store 125.

The server computer 110 receives 820 a query statement specifying the value stored by the array field from a client device. For example, the client device 120 may provide a query statement to the server computer 110 directed at retrieving data from the collection of documents, such as one or more documents including the value. The query module 121 may parse the received query statement in order to execute the relevant query. In some embodiments, the query statement may specify one or more indexes to be selected from for executing the query statement.

The server computer 110 determines 830 a de-duplication index corresponding to the array field which includes a unique entry for the value. In particular, the unique entry includes a plurality of respective identifiers of the plurality of documents including the value (e.g., pointers to the documents in the database). For example, the query module 121 may obtain information describing one or more indexes from the index module 122 usable to execute the received query statement. In this case, the query module 121 may select the de-duplication index based on the obtained information, such as determining the de-duplication index is an optimal index for the query based on the available indexes and a set of optimization criteria. Furthermore, the query module 121 may generate a QEP including the de-duplication index. Alternatively, or additionally, the server computer 110 may determine the de-duplication index 830 based on one or more indexes specified in the received request.

Using the de-duplication index, the server computer 110 retrieves 840 a document from the collection that includes the value. For example, the query module 121 may use a QEP including the de-duplication index to execute the query statement. In particular, the query module 121 or the data module 123 may use identifier of the document included in the unique entry in the de-duplication index to locate the document in the data store 125. The server computer 110 may use additional indexes in combination with the de-duplication index to execute the query, such as other de-duplication indexes or conventional indexes.

The server computer 110 provides 850 the retrieved document to the client device. For example, the server computer 110 may provide all of the data included in the document to the client device 120. Alternatively, the server computer 110 may provide a portion of the data included in the document to the client device 120, such as data relevant to the received query statement.

Figure 9:
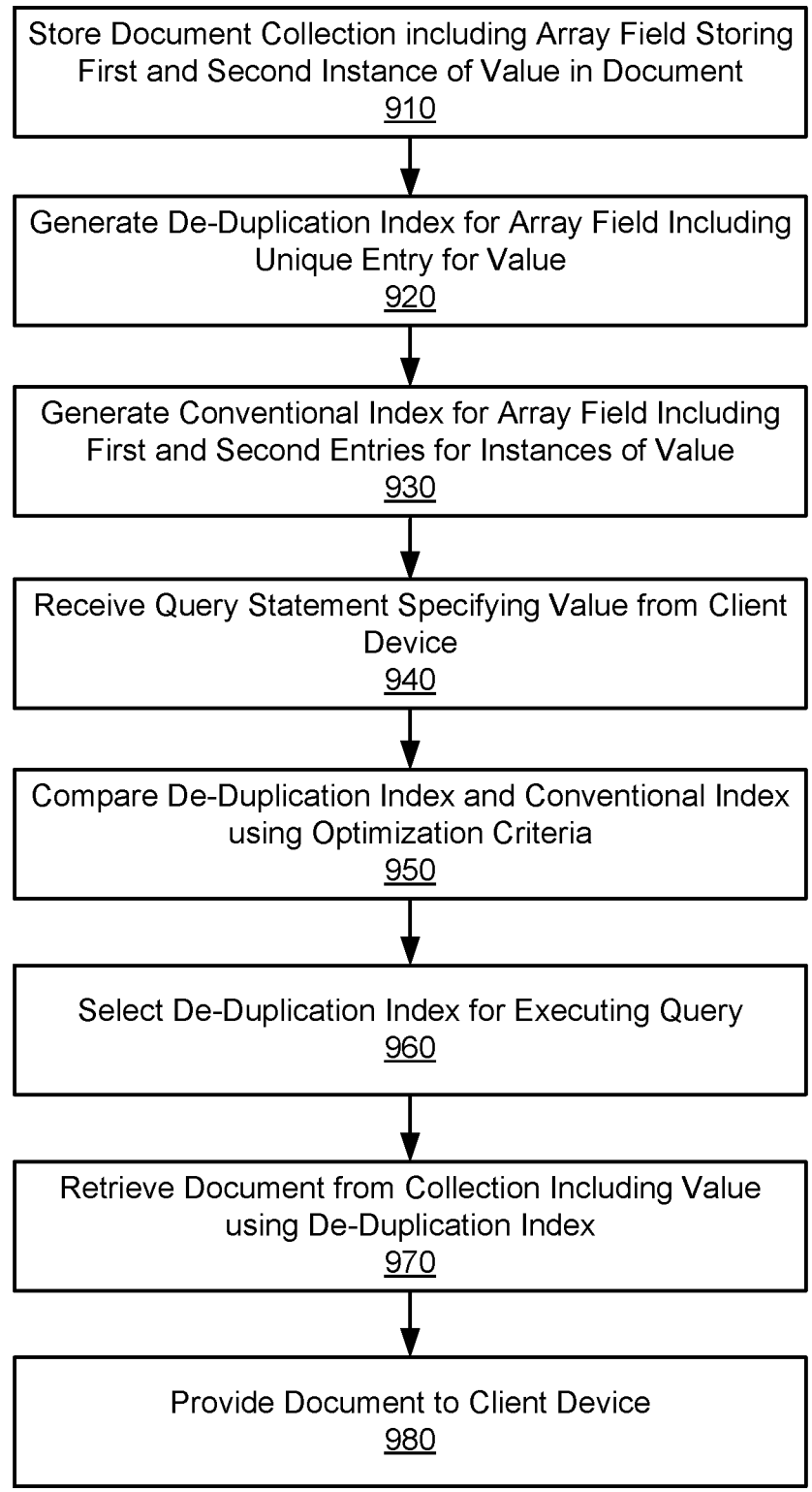
FIG. 9 is a flow chart illustrating a process for querying a document-oriented database by selecting from a de-duplication index and a conventional index, according to an embodiment.

FIG. 9 is a flow chart illustrating a process for querying a document-oriented database by selecting from a de-duplication index and a conventional index, according to an embodiment. As with the process 700 described above, the process 800 shown in FIG. 8 may be performed by components of a document-oriented database system (e.g., the server computer 110). Other entities may perform some or all of the steps in FIG. in other embodiments. Embodiments may include different and/or additional steps or perform the steps in different orders.

The server computer 110 stores 810 a collection of documents including an array field which stores a first instance and second instance of a value (i.e., duplicate values) in an array for a document. The array may include further instances of the value, and may also include one or more instances of other values. Furthermore, the array field may store instances of the value in other arrays included in other documents of the collection. The server computer 110 may store the collection of documents in the data store 125.

The server computer 110 generates 920 a de-duplication index for the array field including a unique entry for the value (i.e., a single entry for the first and second instance of the value). For example, the index module 122 may generate the de-duplication index for the array field based on a command received from the client device 120 or another component of the server computer 110. Alternatively, the index module 122 may automatically generate the de-duplication index based on an event, such as an update to the data included in the collection of documents.

The server computer 110 further generates 930 a conventional index for the array field including a first entry for the first instance of the value and a second entry for the second instance of the value. As described above at step 920, the conventional index may be generated in based on a command or may be automatically generated based on an event.

Similar to the process 800, the server computer 110 receives 940 a query statement specifying the value stored by the array field from a client device. In executing the received query statement, the server computer 110 compares 950 the de-duplication index and the conventional index based on a set of optimization criteria. For example, the query module 121 may obtain information describing the de-duplication index and the conventional indexes from the index module 122, as described above in relation to the process 900. The set of optimization criteria used by the server computer 110 to compare the indexes may include optimization rules for selecting optimal indexes and/or techniques for determining execution costs associated with various indexes, as described above in relation to the query optimization module 500.

Based on the comparison, the server computer 110 selects 60 the de-duplication index to be used for executing the query statement. For example, the query module 121 may determine that the de-duplication index is more optimal for executing the query than the conventional index based on optimization rules and/or execution costs.

Similar to the process 800, using the de-duplication index, the server computer 110 retrieves 870 the document from the collection that includes first and second instances of the value. Furthermore, the server computer 110 provides 980 the retrieved document to the client device.

Computer Architecture

Figure 10:
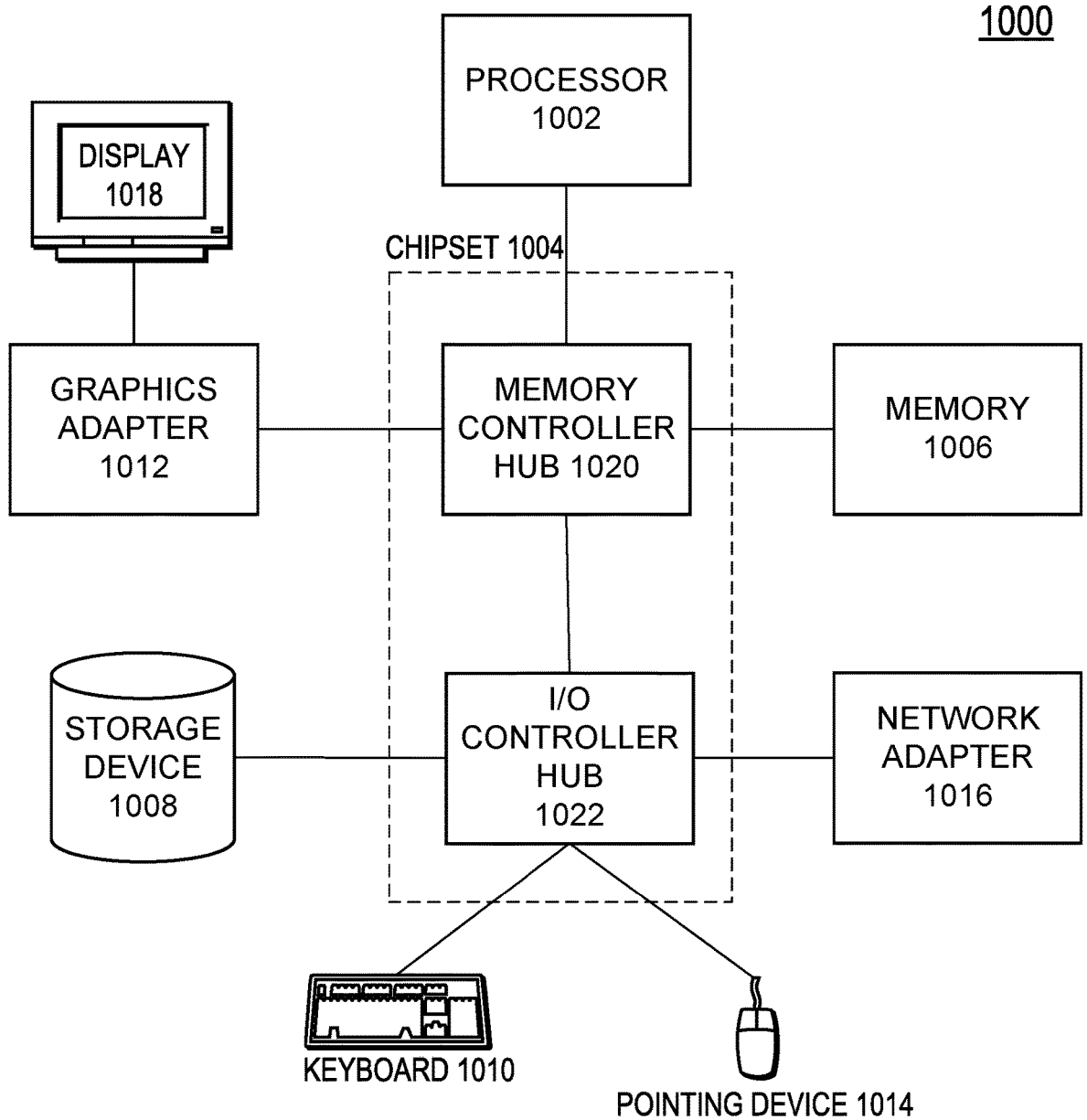
FIG. 10 is a block diagram illustrating a functional view of a typical computer system according to one embodiment.

FIG. 10 is a high-level block diagram illustrating a functional view of a typical computer system for use as one of the entities illustrated in the environment 100 of FIG. 1 according to an embodiment. Illustrated are at least one processor 1002 coupled to a chipset 1004. Also coupled to the chipset 1004 are a memory 1006, a storage device 1008, a keyboard 1010, a graphics adapter 1012, a pointing device 1014, and a network adapter 1016. A display 1018 is coupled to the graphics adapter 1012. In one embodiment, the functionality of the chipset 1004 is provided by a memory controller hub 1020 and an I/O controller hub 1022. In another embodiment, the memory 1006 is coupled directly to the processor 1002 instead of the chipset 1004.

The storage device 1008 is a non-transitory computer-readable storage medium, such as a hard drive, compact disk read-only memory (CD-ROM), DVD, or a solid-state memory device. The memory 1006 holds instructions and data used by the processor 1002. The pointing device 1014 may be a mouse, track ball, or other type of pointing device, and is used in combination with the keyboard 1010 to input data into the computer system 1000. The graphics adapter 1012 displays images and other information on the display 1018. The network adapter 1016 couples the computer system 1000 to a network.

As is known in the art, a computer 1000 can have different and/or other components than those shown in FIG. 10. In addition, the computer 1000 can lack certain illustrated components. For example, a computer system 1000 acting as a server computer 110 may lack a keyboard 1010 and a pointing device 1014. Moreover, the storage device 1008 can be local and/or remote from the computer 1000 (such as embodied within a storage area network (SAN)).

The computer 1000 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1008, loaded into the memory 1006, and executed by the processor 1002.

The types of computer systems 1000 used by the entities of FIG. 1 can vary depending upon the embodiment and the processing power used by the entity. For example, a client device 115 may be a mobile phone with limited processing power, a small display 1018, and may lack a pointing device 1014. The server computer 110, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A method for optimizing queries of databases, the method comprising:
   storing, by a database system, a set of documents comprising a plurality of fields, the plurality of fields including an array field, wherein the array field stores an array including a first instance of a value and a second instance of the value for a document from the set of documents;
generating, by the database system, a de-duplication index corresponding to the array field including a unique entry for the value, the unique entry including an identifier of the document;
generating, by the database system, a conventional index corresponding to the array field including a first entry for the first instance of the value and a second entry for the second instance of the value, the first and second entry including the identifier of the document;
receiving, by the database system from a client device, a query statement for querying a database, the query statement specifying the value;
querying the database based on the query statement, the querying comprising:
comparing the de-duplication index and the conventional index based on a set of optimization criteria, wherein the comparison includes comparing costs associated with executing the query statement using the de-duplication index and the conventional index;
selecting, based on the comparison, the de-duplication index; and
retrieving, using the de-duplication index, the document from the database; and
providing the document to the client device.

2. The method of claim 1, wherein the array field stores a second array including the value for a second document from the set of documents, and the unique entry of the de-duplication index further includes an identifier of the second document.

3. The method of claim 2, wherein the plurality of fields includes a second field which stores a second value for the second document, and further comprising:
generating, by the database system, a second de-duplication index corresponding to the second field including a second unique entry for the second value, the second unique entry including an identifier of the second document;
receiving, by the database system, a second query statement for querying the database, the second query statement specifying the value and the second value;
querying the database based on the second query statement, the querying comprising:
retrieving, using the de-duplication index and the second de-duplication index, the second document from the database; and
providing the second document to the client device.

4. The method of claim 3, wherein generating the first and second de-duplication indexes comprises:
generating a multi-field de-duplication index for the array field and the second field, the multi-field de-duplication index including the first and second de-duplication indexes.

5. The method of claim 4, wherein the second query statement includes:
a first filter applied to the array field specifying the value;
a second filter applied to the second field specifying the second value; and
a logical operator applied to the first and second filters.

6. The method of claim 5, wherein executing the second query statement further comprises:
responsive to determining, based on the first filter, the document includes the value using the de-duplication index, receiving first index results including the identifier of the document;
responsive to determining, based on the second filter, the second document includes the second value using the second de-duplication index, receiving second index results the identifier of the second document; and
applying the logical operator to the first and second index results.

7. The method of claim 6, wherein the first and second index results are represented using a bitmap, and applying the logical operator further comprises:
performing one or more bitwise operations corresponding to the logical operator on the bitmap.

8. The method of claim 1, wherein selecting the de-duplication index comprises:
determining, based on the optimization criteria, a first cost of executing the query statement using the de-duplication index;
determining, based on the optimization criteria, a second cost of executing the query statement using the conventional index; and
selecting the de-duplication index based on a comparison of the first cost and the second cost.

9. The method of claim 1, wherein the optimization criteria include a set of rules for selecting an optimal index, and selecting the de-duplication index comprises:
determining, based on the set of rules, the de-duplication index is the optimal index for the query statement relative to the conventional index.

10. The method of claim 1, wherein retrieving the document further comprises:
generating a set of distinct query plans for querying the database using the de-duplication index;
determining costs corresponding to each query plan of the set of distinct query plans;
selecting, based on the costs, an optimal query plan; and
retrieving the document from the database using the optimal query plan.

11. The method of claim 1, wherein the de-duplication index corresponds to a field of an object stored by the array field.

12. The method of claim 1, wherein the query statement is represented using structured query language (SQL).

13. The method of claim 1, wherein the de-duplication index is an inverted index.

14. A method for optimizing queries of databases, the method comprising:
storing, by a database system, a set of documents comprising a plurality of fields, the plurality of fields including an array field, wherein the array field stores arrays including a value for a plurality of documents from the set of documents;
receiving, by the database system from a client device, a query statement for querying a database, the query statement specifying the value;
identifying a de-duplication index based on a cost of executing the query statement using the de-duplication index, the de-duplication index corresponding to the array field including a unique entry for the value, the unique entry including a plurality of respective identifiers for the plurality of documents;
retrieving, using the de-duplication index, a document from the plurality of documents including the value stored by the array field from the database; and
providing the retrieved document to the client device.

15. The method of claim 14, wherein the plurality of fields includes a second array field which stores a second value for a second plurality of documents from the set of documents, and further comprising:

receiving, by the database system, a second query statement for querying the database, the second query statement specifying the value and the second value;

determining a second de-duplication index corresponding to the second array field including a unique entry for the second value, the unique entry for the second value including a plurality of respective identifiers for the second plurality of documents;

retrieving, using the de-duplication index and the second de-duplication index, a second document included in the second plurality of documents from the database, the second document including the second value stored by the field; and providing the second document to the client device.

16. The method of claim 15, wherein generating the first and second de-duplication indexes comprises:

generating a multi-field de-duplication index for the array field and the second field, the multi-field de-duplication index including the first and second de-duplication indexes.

17. The method of claim 14, wherein identifying the de-duplication index comprises:

determining a cost of executing the query statement using the de-duplication index based on a set of optimization criteria, the set of optimization criteria including comparing costs associated with query execution plans for executing the query statement using the de-duplication index; and selecting the de-duplication index based on the cost.

18. The method of claim 14, wherein retrieving the document further comprises:

generating a set of distinct query plans for querying the database using the de-duplication index;

determining costs corresponding to each query plan of the set of distinct query plans;

selecting, based on the costs, an optimal query plan; and retrieving the document from the database using the optimal query plan.

19. A non-transitory computer readable storage medium storing instructions that when executed by a computer processor, cause the computer processor to perform the steps comprising:

storing, by a database system, a set of documents comprising a plurality of fields, the plurality of fields including an array field, wherein the array field stores an array including a first instance of a value and a second instance of the value for a document from the set of documents;

generating, by the database system, a de-duplication index corresponding to the array field including a unique entry for the value, the unique entry including an identifier of the document;

generating, by the database system, a conventional index corresponding to the array field including a first entry for the first instance of the value and a second entry for the second instance of the value, the first and second entry including the identifier for the document;

receiving, by the database system from a client device, a query statement for querying a database, the query statement specifying the value;

querying the database based on the query statement, the querying comprising:

comparing the de-duplication index and the conventional index based on a set of optimization criteria, wherein the comparison includes comparing costs associated with executing the query statement using the de-duplication index and the conventional index;

selecting, based on the comparison, the de-duplication index; and retrieving, using the de-duplication index, the document from the database; and providing the document to the client device.

20. The non-transitory computer readable storage medium of claim 19, wherein the array field stores a second array including the value for a second document from the set of documents, and the unique entry of the de-duplication index further includes an identifier of the second document.

\* \* \* \* \*

UNITED STATES PATENT AND TRADEMARK OFFICE
CERTIFICATE OF CORRECTION

PATENT NO. : 11,416,458 B2
APPLICATION NO. : 15/930351
DATED : August 16, 2022
INVENTOR(S) : Vemulapalli et al.

It is certified that error appears in the above-identified patent and that said Letters Patent is hereby corrected as shown below:

In the Claims

In Column 22, in Claim 6, Line 4, delete "results the" and insert -- results including the --, therefor.

Signed and Sealed this
Twelfth Day of September, 2023

Katherine Kelly Vidal
*Director of the United States Patent and Trademark Office*